United States Patent
Ogura

[11] Patent Number: 5,110,774
[45] Date of Patent: * May 5, 1992

[54] HOMOGENEOUS SOLID SOLUTION MATERIAL AND METHOD OF MANUFACTURING THE SAME

[75] Inventor: Atsushi Ogura, Kanagawa, Japan

[73] Assignee: Atsushi Ogura, Kanagawa, Japan

[*] Notice: The portion of the term of this patent subsequent to Jan. 29, 2008 has been disclaimed.

[21] Appl. No.: 565,373

[22] Filed: Aug. 9, 1990

Related U.S. Application Data

[63] Continuation-in-part of Ser. No. 259,400, Oct. 18, 1988, Pat. No. 4,998,648, which is a continuation of Ser. No. 930,333, Nov. 12, 1986, abandoned.

[30] Foreign Application Priority Data

Nov. 29, 1985 [JP] Japan .................. 60-267199
Jun. 13, 1986 [JP] Japan .................. 61-136162

[51] Int. Cl.$^5$ .............................................. C04B 35/26
[52] U.S. Cl. ................................. 501/126; 501/103; 428/329
[58] Field of Search ............... 501/103, 105, 106, 126, 501/128; 428/329

[56] References Cited
U.S. PATENT DOCUMENTS

| | | |
|---|---|---|
| 3,044,867 | 7/1962 | Edstrom . |
| 3,892,908 | 7/1975 | Lovness . |
| 3,996,392 | 12/1976 | Berg et al. . |
| 4,051,042 | 3/1977 | Chassaigne . |
| 4,065,519 | 12/1977 | Kock . |
| 4,075,391 | 2/1978 | Berg et al. . |
| 4,160,719 | 7/1979 | Pollock . |
| 4,180,482 | 12/1979 | Nishino et al. . |
| 4,238,341 | 12/1980 | Kato et al. . |
| 4,447,501 | 5/1984 | Shigeru et al. . |
| 4,491,619 | 1/1985 | Biermann et al. . |
| 4,587,157 | 5/1986 | Brock et al. . |
| 4,619,653 | 12/1986 | Asai et al. . |
| 4,624,798 | 11/1986 | Gindrup et al. . |
| 4,726,991 | 2/1988 | Hyatt et al. . |
| 4,820,581 | 4/1989 | Saito et al. . |
| 4,988,648 | 1/1991 | Atsushi ................... 501/126 |

Primary Examiner—William R. Dixon, Jr.
Assistant Examiner—Chris Gallo
Attorney, Agent, or Firm—Darby & Darby

[57] ABSTRACT

A metal oxide-ceramic composite powder consisting of fine ceramic particles having a metal oxide coating firmly bonded to the surface thereof is molten at high temperature and then cooled to produce a material in the form of a solid solution in which the metal oxide component and the ceramic component are substantially homogeneously mixed together. Also, the metal oxide-ceramic composite powder is mixed with fine particles of a second ceramic and/or particles of a metal, and the mixture is baked to produce a sintered material.

8 Claims, 4 Drawing Sheets

HOMOGENEOUS SOLID SOLUTION MATERIAL AND METHOD OF MANUFACTURING THE SAME

CROSS REFERENCE TO RELATED APPLICATIONS

This application is a continuation-in-part of U.S. patent application Ser. No. 259,400 filed Oct. 18, 1988, now U.S. Pat. No. 4,998,648 which is a continuation of U.S. patent application Ser. No. 930,333, filed Nov. 12, 1986, now abandoned; and is related to U.S. patent application Ser. No. 237,646 filed Aug. 26, 1988, now U.S. Pat. No. 4,952,463 granted Aug. 28, 1990, which in turn is a continuation of U.S. patent application Ser. No. 921,679 filed Oct. 28, 1986, now abandoned; and U.S. patent application Ser. No. 565,374 titled "METAL OXIDE CERAMIC COMPOSITE POWDER AND METHOD OF MANUFACTURING THE SAME" filed on even date herewith.

TECHNICAL FIELD

This invention relates to a material consisting of at least a ceramic component and a metal oxide component formed into a homogeneous solid solution and relates also to a method of manufacturing the same.

BACKGROUND

It is generally difficult to manufacture a metal oxide/ceramic material having a uniform and homogeneous microstructure even when a mixture of fine particles of a plurality of kinds on inorganic powder materials is sintered or molten after being thoroughly kneaded. That is, in order to obtain a composite in the form of a homogeneous solid solution of a plurality of kinds of components, it is necessary to thoroughly homogeneously mix fine particles of those components. However, it is physically difficult to thoroughly homogeneously mix such components. Further, due to the differences of the melting points of those components, separation of one of the components having a higher melting point from another having a lower melting point inevitably occurs. Thus, it is very difficult to manufacture a composite having a thoroughly homogeneous microstructure which can satisfy the desired physical properties and functional requirements.

In an effort to solve such a problem, studies have been undertaken for manufacturing a metal oxide/ceramic material by baking a mixture of super-fine particles of a plurality of kinds of components having a fine particle size in the order of the angstrom unit. In spite of such an effort, satisfactory results have not yet been attained.

Thus, a composite including a ceramic component and a metal oxide component thoroughly homogeneously compounded together has not existed up to now. Even if such a composite were present, its physical properties could only be estimated from those of the individual components before being mixed.

SUMMARY OF THE INVENTION

With a view to solving the prior art problems pointed out above, it is an object of the present invention to provide a novel composite in the form of a thoroughly homogeneous solid solution having at least a ceramic component and a metal oxide component and a method of manufacturing the same.

Another object of the present invention is to provide a material comprising a metal component additionally homogeneously compounded with the ceramic component and the metal oxide component described above.

The material according to the present invention is in the form of a solid solution provided by melting and cooling a metal oxide-ceramic composite powder of fine ceramic particles having a metal oxide coating, preferably in crystalline form, firmly bonded to the surface thereof.

In an embodiment of the present invention, this material is manufactured by melting a metal oxide-ceramic composite powder of fine ceramic particles having a metal oxide coating firmly bonded to the surface thereof as described above, in a high-temperature furnace thereby turning the powder into a solid solution of a metal oxide component and a ceramic component.

In another embodiment of the present invention, the material is manufactured by melting a metal oxide-ceramic composite powder of fine ceramic particles having a metal oxide coating firmly bonded to the surface thereof as described above, at a high temperature and spraying the melt onto an article to be coated thereby coating the article with a solid solution of a metal oxide component and a ceramic component.

The material thus obtained is in the form of a homogeneous solid solution of the metal oxide and ceramic components. Where the metal oxide is a ferrite or a nickel, aluminum, copper or chromium oxide, or combinations thereof, the material provides an electrical insulator or a semiconductor having an excellent heat resistivity and a high mechanical rigidity and can find many applications as a material of various industrial products. For example, the material according to the present invention can be used as a material of electrical and electronic parts exhibiting excellent functional characteristics, such as, heat generating elements, thermistors, varistors, magnetic coatings, dielectric elements, pyroelectric elements, piezoelectric elements, photoelectric elements, photomagnetic elements and the like.

According to still another embodiment of the present invention, the material is manufactured by sintering fine particles to a second ceramic and/or particles or a metal together with a metal oxide-ceramic composite powder of the fine particles of a first ceramic having a metal oxide coating firmly bonded to the surface thereof.

This sintered material according to the present invention is obtained by mixing the metal oxide-ceramic composite powder with the second fine ceramic particles and/or the metal particles, adding water and/or a binder to the mixture and kneading the mixture to turn it into a sludge, charging the sludge into a mold which is under vibration, heating the sludge in the mold to vaporize the water therefrom, imparting pressure by a pressure plate to the sludge charged in the vibrating mold, heating the sludge again to shape it into a molded block, separating the molded block from the mold, and baking the molded block at a high temperature.

Fine ceramic particles preferably used in the present invention include those of oxides containing a metallic element or a semimetallic element, such as zirconia ($ZrO_2$), zircon ($ZrSiO_4$), silicon dioxide ($SiO_2$), alumina ($Al_2O_3$), cobalt oxide, titanium oxide and boron oxide. Also, fine particles and compounds such as those of nitrides including silicon nitride, those of carbides including silicon carbide and those of various mixtures of the aforementioned materials may be used. Further, the metal oxide bonded to the surface of such fine ceramic particles comprise preferably an oxide containing a metallic element such as iron, nickel, cobalt, barium or titanium or an oxide containing a semimetallic element such as silicone, boron, gallium, germanium, among others, or non-metallics such as selenium, tellurium, polonium, among others.

In the material thus obtained, the components are homogeneously compounded together. The material is physically excellent in its mechanical properties, corrosion resistivity and heat resistivity and is functionally excellent in its magnetic characteristics, electrical characteristics, etc. Therefore, the composite can find a variety of industrial applications as a material for producing a variety electronic or mechanical parts.

A ferrite-ceramic composite powder was invented by the inventor of the present application and is disclosed in a co-pending patent application, Ser. No. 237,646, filed Aug. 26, 1988 and titled "Ferrite Ceramic composite Powder And Method Of Manufacturing The Same". The ferrite-ceramic composite powder is manufactured by the steps of bringing an aqueous solution of ferric chloride ($FeCl_3$) into contact with many pieces or pellets of iron in the presence of a magnetic field to turn the ferric chloride solution into an aqueous solution of a complex ion, mixing this complex ion solution with an aqueous solution of ferric chloride containing many fine ceramic particles and agitating the mixture to obtain a composite aqueous solution, mixing an aqueous solution of caustic soda with the composite aqueous solution and agitating the mixture to cause a reduction reaction with a substantially uniform deposition of dark brown ferrite crystals on the surface of the fine ceramic particles, rinsing the fine ceramic particles covered with the ferrite to remove remaining dilute salt water, and drying the ferrite-ceramic composite particles.

Improvements in the composite powder by using additional metal elements and combinations thereof are disclosed in the aforementioned copending application Ser. No. 565,374 entitled "METAL OXIDE CERAMIC COMPOSITE POWDER AND METHOD OF MANUFACTURING THE SAME", filed on even date herewith, which disclosure is incorporated herein.

Other objects and features of the present invention will become apparent from the following detailed description.

DESCRIPTION OF THE PREFERRED EMBODIMENTS

(1) Metal-Ceramic Composite Powder

Figure 1:
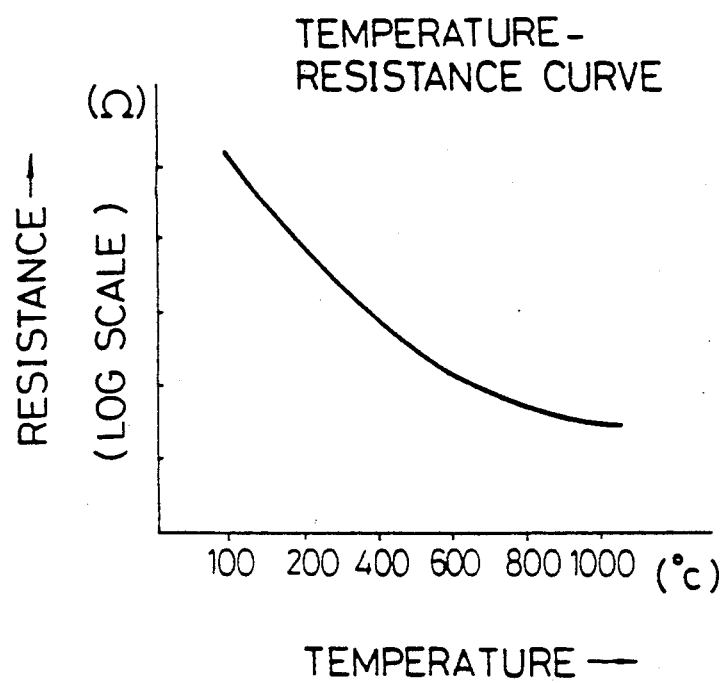
FIG. 1 shows the relation between the heating temperature and the resistance of a semiconductor produced using one embodiment of the present invention.

A metal oxide-ceramic composite powder of fine particles of a ceramic material having high-purity crystals of a metal oxide firmly bonded to the surface thereof is obtained by steps which will be described below and which are more fully described in the aforementioned application Ser. No. 565,374 entitled "METAL OXIDE CERAMIC COMPOSITE POWDER AND METHOD OF MANUFACTURING THE SAME", filed on even date.

First, at least one magnet having a strong magnetic force is placed in a vessel containing an aqueous solution of one or a combination of various metal chloride or hydrate compositions having a concentration of about 5% to 35% to establish a magnetic field. Then, many pieces of a magnetic material such as iron, for example, iron pellets having a grain size of about 0.1 mm to 4 mm are immersed in the aqueous solution of metal chloride, and the solution is thoroughly agitated. Then, the solution is filtered to obtain an aqueous solution of a complex ion.

In the above steps, the aqueous solution of metal chloride or hydrate is brought into contact with the magnetized iron pellets in the vessel. Therefore, many cathodes and anodes are formed as a result of the electrolytic ion exchange, and hydrogen ions attracted to the cathodes are discharged as hydrogen gas. Thus, the complex ion solution contains stabilized anions and cations.

An aqueous solution of one, or a combination of various metal chloride or hydrate compositions having a concentration of about 5% of 35% and containing fine particles of a ceramic material having a particle size distribution of about 0.05 micron to several mm, preferably, 0.05 to 20 micron, is separately prepared. The complex ion solution is mixed with this metal chloride solution in a proportion of about 30% to 50% of the total volume. The mixture is thoroughly agitated to provide a composite aqueous solution. This composite aqueous solution is acidic and contains $Cl^-$/ions.

Then, when an aqueous solution of caustic soda having a concentration of about 30% is mixed with the composite aqueous solution containing the fine ceramic particles, crystals of a metal oxide corresponding to the original metal chloride(s) or hydrate(s) are substantially uniformly deposited on the surface of the fine ceramic particles. The remainder is dilute salt water.

The metal oxide-ceramic composite particles are then allowed to precipitate, and the supernatant portion of the solution is discarded. Alternatively, water is separated from the solution by centrifugal separation to leave the precipitate. Then, water is added to the precipitate to wash away the salt. Thereafter, the water remaining still in the precipitate is separated by evaporation, and the precipitate is dried to provide the metal oxide-ceramic composite particles in which the high purity metal oxide crystals are deposited on the surface of the fine ceramic particles.

In the metal oxide-ceramic composite particles thus manufactured, the metal oxide is substantially uniformly deposited on the surface of each of the fine ceramic particles. The size distribution of the composite particles is about 0.1 micron to 25 micron when the original particle size of the fine ceramic particles is about 0.03 micron to 20 micron.

In the metal oxide-ceramic composite powder described above, the metal oxide makes a plating-like ionic bond to the surface of the fine ceramic particles, and the bond is so strong that the metal oxide would not be stripped off even by impartation of mechanical friction or impact.

The above description has referred to the use of fine particles of zircon ($ZrSiO_4$) by way of example. However, it is apparent that the ceramic material preferably used in the present invention is in no way limited to zircon, and other fine ceramic particles preferably used in the present invention include those of oxides containing a metallic element or a semimetallic element, such as, zirconia ($ZrO_2$), silicon dioxide ($SiO_2$), alumina ($Al_2O_3$), cobalt oxide, titanium oxide, barium oxide and boron oxide. Also, fine particles and compounds such as those of nitrides including silicon nitride, those of carbides including silicon carbide and those of various mixtures of the aforementioned materials may be used.

Also, the metal oxide may comprise a metallic element such as cobalt, barium, titanium, nickel, aluminum, copper, chromium, germanium, gallium, magnesium, tin, molydendum, manganese or cadmium, among others or a semimetallic element such as Si, Sa, P, among others, or combinations thereof.

The metal chlorides and hydrates thereof usable with the present invention may be based on various metals. Those usable, among others, are:

| | | |
|---|---|---|
| $AlCl_3.6H_2O$ | $MgCl_2.4H_2O$ | $TeCl_4$ |
| $BaCl_2.2H_2O$ | $MoCl_5$ | $TlCl$ |
| $BeCl_2$ | $NiCl_2.6H_2O$ | $TiCl_4$ |
| $CrCl_3.6H_2O$ | $PtCl_4.6H_2O$ | $VOCl_2$ |
| $CoCl_2.6H_2O$ | $SiCl_4$ | $YCl_3.6H_2O$ |
| $CuCl_2.2H_2O$ | $AgCl$ | $ZnCl_2$ |
| $CdCl_2.2\frac{1}{2}H_2O$ | $SrCl_2.6H_2O$ | $ZrCl_4$ |
| $GeCl_4$ | $SnCl_2.2H_2O$ | |
| $MnCl_2.4H_2O$ | $TaCl_5$ | |

These metal chlorides form complex ions as described above. Exemplary of such complex ions are $[Ni_2Cl_3]^{+1}$, $[Ni_2Cl_4]^{+2}$, $[Al_3Cl_7]^{+2}$, $[Cu_3Cl_4]^{+2}$, $[Sr_2Cl_3]^{+1}$, $[Cr_2Cl_5]^{+1}$, etc.

The invention is not limited to the listed compounds and other metal chlorides or hydrates are usable with the present invention. Also, mixtures or composites of the metal oxides, which produce proportional metal oxide deposition, may also be produced. For example, compounds such as Ni.Al.Cr.Ox, Ni.Al.Ox, Ni.Cr.Ox, Ni.Cr.B.Ox, Ba.Ti.Ox, Ba.Ti.Cu.Ox, Cu.Ba.Y.Ox and others may be produced by the same process.

Examples of the multi-component composite compositions which can be used are given below:

1) Fe-series:

| (a) | | (b) | |
|---|---|---|---|
| | Fe.Co.Ox | | Fe.Co.B.Ox |
| | Fe.Ni.Ox | | Fe.Ni.B.Ox |
| | Fe.Cr.Ox | | Fe.Cr.B.Ox |
| | Fe.Zr.Ox | | Fe.Zr.B.Ox |
| | Fe.Cu.Ox | | Fe.Cu.B.Ox |
| | Fe.Si.Ox | | Fe.Si.B.Ox |
| | Fe.Ti.Ox | | Fe.Ti.B.Ox |
| | Fe.Mn.Ox | | Fe.Mn.B.Ox |
| | Fe.AL.Ox | | Fe.AL.B.Ox |
| | Fe.Mg.Ox | | Fe.Mg.B.Ox |
| | Fe.Ba.Ox | | Fe.Ba.B.Ox |
| | etc. | | etc. |

As the source of the element B, $Na_2B_4O_7.10H_2O$ is used.

2) Ni-series:

| (a) | | (b) | |
|---|---|---|---|
| | Ni.Co.Ox | | Ni.Co.B.Ox |
| | Ni.Cr.Ox | | Ni.Cr.B.Ox |
| | Ni Zr.Ox | | Ni.Zr.B.Ox |
| | Ni.Cu.Ox | | Ni.Cu.B.Ox |
| | Ni.Si.Ox | | Ni.Si.B.Ox |
| | Ni.Ti.Ox | | Ni.Ti.B.Ox |
| | Ni.AL.Ox | | Ni.AL.B.Ox |
| | Ni.Mn.Ox | | Ni.Mn.B.Ox |
| | Ni.Mg.Ox | | Ni.Mg.B.Ox |
| | Ni.Ba.Ox | | Ni.Ba.B.Ox |
| | etc. | | etc. |

3) Ba-series:

| | |
|---|---|
| Ba.Cu.Ox | Y.Ba.Cu.Ox |
| Ba.La.Ox | Y.Ba.La.Ox |
| Ba.Ti.Ox | Y.Ba.Ti.Ox |
| Ba.Zr.Ox | Y.Ba.Zr.Ox |
| Ba.AL.Ox | Y.Ba.AL.Ox |
| etc. | etc. |

4) Other examples:

| |
|---|
| Y.Ba.Ti.Cu.Ox |
| Y.Ba.Ti.Zn.Ox |
| Y.Ba.Zr.Cu.Ox |
| Y.Ba.Zr.Pb.Ox |
| Fe.Ni.Mn.Ox |
| Fe.Co.Mn.Ox |
| Fe.Sn.Ox |
| Fe.Se.Ox |
| Fe.Se.Ag |
| Fe.Co Se.Ag.Ox |
| etc. |

Each of the elements in the composite powders comes from an aqueous solution of each of the corresponding chlorides, such as $FeCl_3.6H_2O$, $NiCl_2.6H_2O$, $CrCl_2.6H_2O$, $CuCl_2.2H_2O$, $BaCl.2H_2O$.

Each of the elements of the homogeneous solid solution such as Fe.Ni.Co.Cr.Ba.Cu. and others has the same composition as that of the composite powders as disclosed in the aforesaid copending application.

Other elements in the HFC homogeneous solid solution such as Si.Ti.Al.Zr.Mg.Mn. and others are derived from fine particles of each of their oxides, metal, semimetal, nonmetal.

Up to 20 or more metal chloride or hydrate, or combinations thereof, can be combined to form composite powders with unique properties. Thus, particles having a uniform distribution of various metals in proportion to their presence in solution can be produced according to the present invention. For example, if 50% by wt. nickel, 30% aluminum and 20% chromium are present, the film coating will contain the same proportion of metal oxides. Another combination would be 60% Ni, 30% Al and 10% Cr, which has been found to act as a positive temperature coefficient (PTC) resistor. This custom processing provides metal ceramic composite materials with unique properties, which have application in many industries, not only in the semiconductor field.

The other metal chlorides and hydrates and the multicomponent compositions listed above can be used in the process for forming the article of each example described herein.

(2) Semiconductor I

As an example, a metal oxide-ceramic composite powder containing $Fe_3O_4$ as its metal oxide component and $ZrSiO_4$ or $ZrO_2$ as its ceramic component and having a particle size distribution of about 0.1 micron to 3 micron is charged into a mold and molded under pressure. The molded block obtained after separation from the mold is placed in a high-temperature furnace the interior of which is maintained at the atmospheric pressure or a lower pressure. Heat treatment on the molded block includes the steps of raising the heating temperature at a rate of 4° C. to 10° C. per minute until a temperature level of 1,200° C. to 1,500° C. is reached, keeping the molded block at the above temperature for about 2 to 6 hours, and cooling the molded block down to the room temperature at a rate of 10° C. to 50° C. per minute, thereby turning the molded block into a solid solution of a semiconductor material. In the manner described above, a semiconductor is manufactured by a very simple method.

In the semiconductor material thus manufactured, the metal oxide component and the ceramic component are homogeneously mixed to form the solid solution. Therefore, the semiconductor material shows an excellent heat resistivity and has a low coefficient of thermal expansion and a high mechanical rigidity.

Further, the semiconductor material exhibits functional property that its electrical resistance decreases exponentially with an increase in the temperature over a wide temperature range of from $+10°$ C. to $+1,200°$ C. Thus, the semiconductor material is suitable for use as a material of a temperature sensor.

By way of example, the ferrite-ceramic composite powder consisting of, for example, 40% by weight of $Fe_3O_4$ and 60% by weight of $ZrSiO_4$ was molded under pressure and was then subjected in an electric furnace to heat treatment which included raising the heating temperature at a rate of 4° C./min, keeping the temperature at 1,400° C. for 6 hours and allowing to cool down, to manufacture a semiconductor material. The material was placed in an atmosphere in which the temperature was changed between $+10°$ C. and $+1,000°$ C., and its electrical resistance was measured. According to the result of measurement, the electrical resistance of the semiconductor material changes as an exponential function of the temperature as shown by the curve in FIG. 1.

It will be apparent from the result of measurement that the temperature characteristic of the semiconductor according to the present invention is quite excellent as compared to that of prior art thermistors whose highest measurable temperature is generally 300° C. or lower.

Further, in a high temperature range (500° C. to 1,200° C.), the semiconductor generates an electromotive force proportional to thermal energy (cal.) applied thereto.

Figure 2:
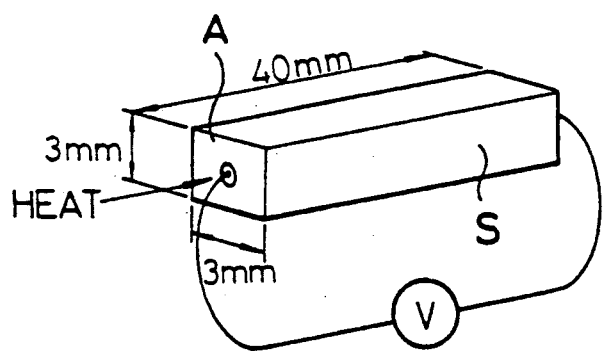
FIG. 2 is a perspective view of a semiconductor block for illustrating the temperature-voltage characteristic of the semiconductor whose resistance value changes relative to the heating temperature as shown in FIG. 1.
Figure 3:
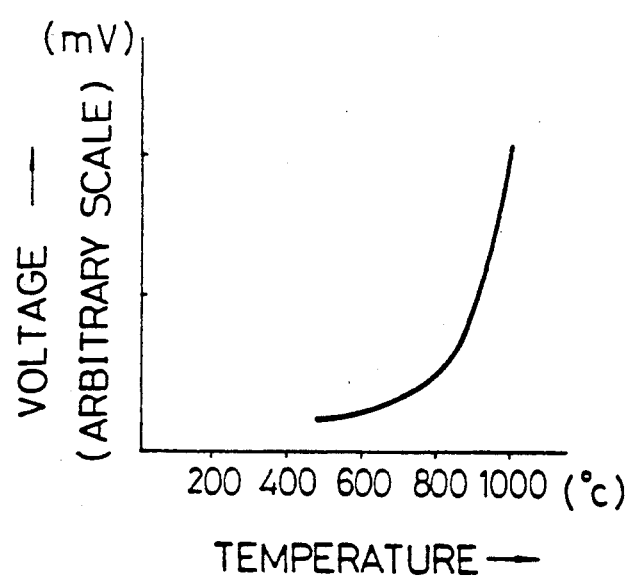
FIG. 3 is a curve showing the relation between the heating temperature and the voltage of the semiconductor block shown in FIG. 2.
Figure 4:
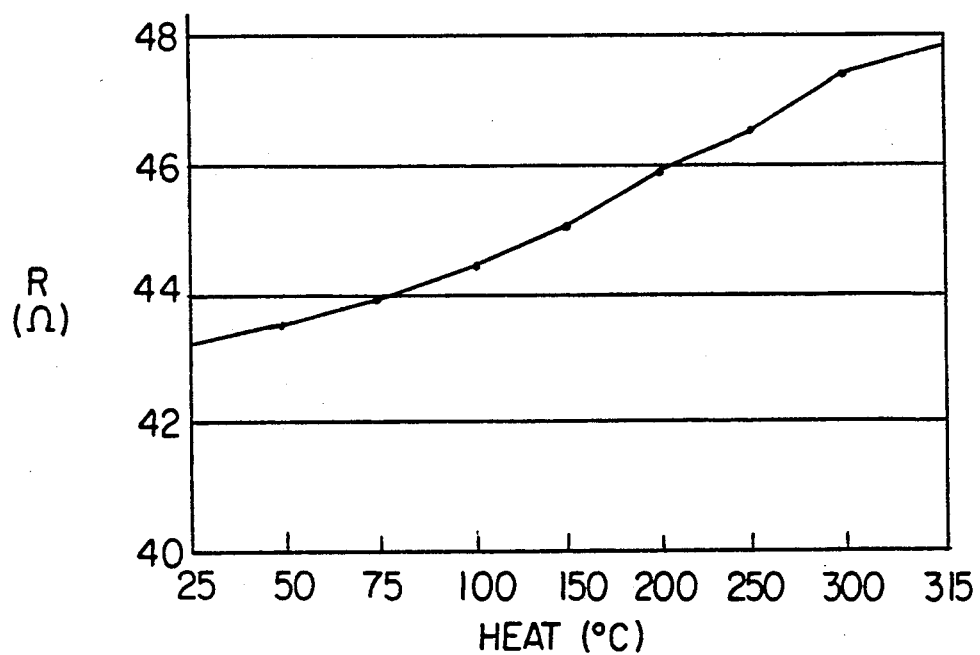
FIG. 4 is a curve showing the relationship between the heating temperature and resistance of a NiAlCrOx semiconductor produced according to the present invention.
Figure 5:
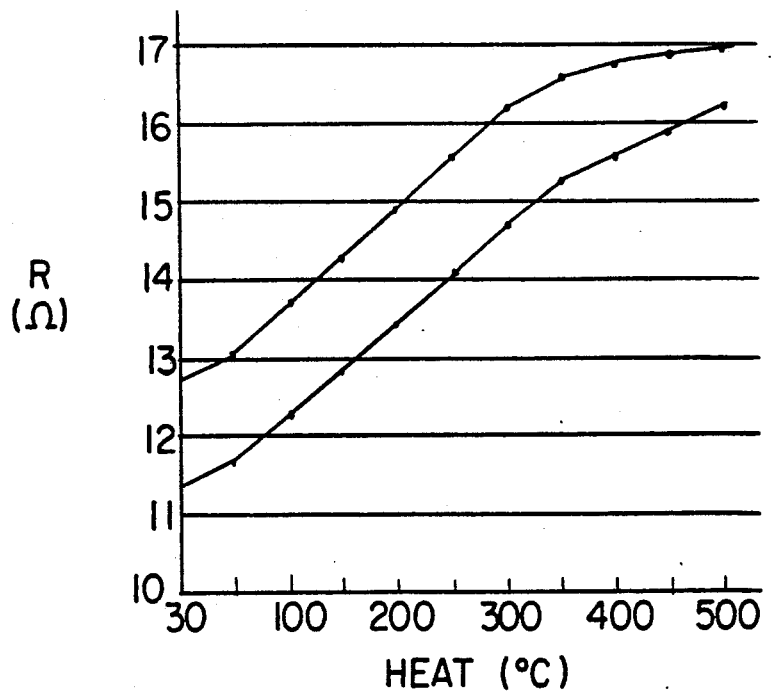
FIG. 5 is a curve showing the relationship between the heating temperature and resistance of two NiAlCrOx semiconductors produced according to the present invention.

By way of example, a block S of semiconductor material having dimensions of 3 mm×3 mm 4 40 mm as shown in FIG. 2 was manufactured under the same conditions as described above. When heat of 500° C. to 1,200° C. was applied to an end face A of the semiconductor block S, and the voltage appearing across terminals $T_1$ and $T_2$ was measured. According to the result of measurement, the generated voltage changes relative to the temperature as shown by the curve of FIG. 3.

Further, when a low DC or AC voltage was applied across the semiconductor block, it generated heat proportional to the applied voltage, current and frequency.

For example, when a semiconductor block having dimension of 5 mm×5 mm×10 mm was manufactured under the same conditions as those described above, and various AC voltages having a frequency of 50 Hz and a current value of 1A were applied across the length of the semiconductor block at the room temperature, the semiconductor block generated heat as shown in Tables 1, 2 and 3.

TABLE 1

| | (10 V, 1 A) | | |
|---|---|---|---|
| Time | 1 min | 3 min | 5 min |
| Temperature | 50° C. | 80° C. | 150° C. |

TABLE 2

| | (20 V, 1 A) | | |
|---|---|---|---|
| Time | 30 sec | 2 min | 3 min |
| Temperature | 150° C. | 350° C. | 600° C. |

TABLE 3

| | (40 V, 1 A) | | |
|---|---|---|---|
| Time | 10 sec | 1 min | 2 min |
| Temperature | 150° C. | 600° C. | 900° C. |

It will be apparent from the above results of measurement that, unlike prior art resistance-type heat generators, the semiconductor of the present invention acts as a low-power heat generator having an improved efficiency of electro-thermal energy conversion.

As a comparative example, fine particles of the ferrite ($Fe_3O_4$) and zircon ($ZrSiO_4$) were merely mechanically mixed and then baked after molding under pressure. However, the individual components were not homogeneously mixed and could not form a solid solution, and the molded block could not act as an excellent heat generator.

(3) Semiconductor II

The ferrite-ceramic composite powder containing $Fe_3O_4$ as its ferrite component and $ZrSiO_4$ or $ZrO_2$ as its ceramic component is melted at a high temperature by a DC-arc type high-speed plasma spray device to coat an article with the melt and, the melt is allowed to cool down to form a solid solution of a semiconductor material coating the article.

The semiconductor thus formed on the article shows functional tendencies similar to those of the semiconductor described in (2). That is, the semiconductor has a temperature-resistance characteristic, a voltage generating characteristic and a heat generating characteristic similar to those of the semiconductor described in (2).

By way of example, the ferrite-ceramic composite powder of, for example, 40% by weight of $Fe_2O_3$ and 60% by weight of $ZrO_2$ and having a particle size distribution of about 0.1 micron to 10 micron was molten at a high temperature by a DC-arc type high-speed plasma spray device using argon (Ar) gas and hydrogen ($H_2$) gas and, the melt was sprayed onto a plate of alumina at a speed at about 400 m/sec. Then, when the melt was rapidly cooled by air, a thin film of a semiconductor material having a thickness of about 150 micron and in the form of a homogeneous solid solution of the ferrite and ceramic components is formed on an alumina plate.

The semiconductor thus formed on the alumina plate was placed in an atmosphere where the temperature changes between $+10°$ C. and $+1,000°$ C., and its electrical resistance was measured. According to the result of measurement, the semiconductor shows a tendency similar to that of the semiconductor described in (2) in its temperature characteristic. In a high temperature range (500° C. to 1,200° C.), the semiconductor generates an electromotive force proportional to thermal energy (cal.) applied thereto. Further, when a low DC or AC voltage is applied across the semiconductor, the semiconductor generates heat proportional to the applied voltage, current and frequency.

The material of the article on which the semiconductor is formed, is in no way limited to alumina. It is apparent that the material may be any one of noncombustible materials including metals, ceramics and fabrics of any suitable shape.

It will be apparent from the above description that the semiconductor according to the present invention is a multi-functional one which is novel over prior art ones. By suitably changing the metal oxide-ceramic composition ratio, heating conditions and other factors, or by using other metal components than the ferrite component, or by using a ceramic material containing various components other than zircon ($ZrSiO_4$) or zirconia ($ZrO_2$), the semiconductor can find a variety of industrial applications. For example, not only N-type or P-type semiconductors can be produced, but also the semiconductor can be used as a material of industrial measuring instruments of magnetic type, dielectric type, piezoelectric type, pyroelectric type, etc. and also as a material of electronic members.

The high-temperature furnace used for the manufacture of the semiconductor may be any one of a vacuum furnace, a reduction furnace, an open furnace, a plasma furnace, etc.

(4) Semiconductor III

Figure 6:
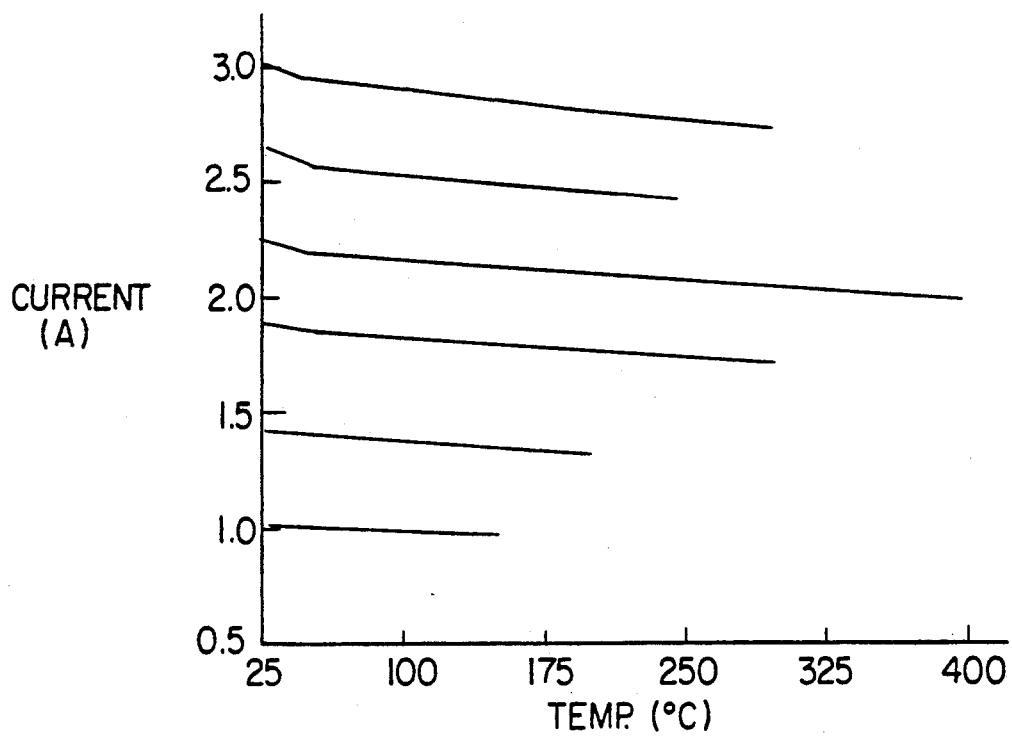
FIG. 6 are curves showing the relationship between current and temperature for a NiAlCrOx semiconductor produced according to the present invention.

A nickel aluminum chrome oxide ceramic composite powder containing 60% nickel oxide, 30% aluminum oxide and 10% chromium oxide, and having zirconia or zircon as its ceramic component is molten at a high temperature by a DC-arc type high speed plasma spray device to coat an alumina substrate with a melt, and the melt is allowed to cool to form a solid solution of a semiconductor material, coating the substrate. The semiconductor thus formed on the article shows functional tendencies opposite to those of the semiconductor described in (2) or (3). That is, the semiconductor exhibits an excellent functional property in that its electrical resistance increases, rather than decreases, exponentially with an increase in the temperature over a wide temperature range of from 30°–500° C. Thus, the semiconductor is suitable for use as a material of a temperature sensor (see FIGS. 1 and 2). FIG. 6 shows that the current flow similarly drops as the resistance increases in these semiconductors.

Figure 7:
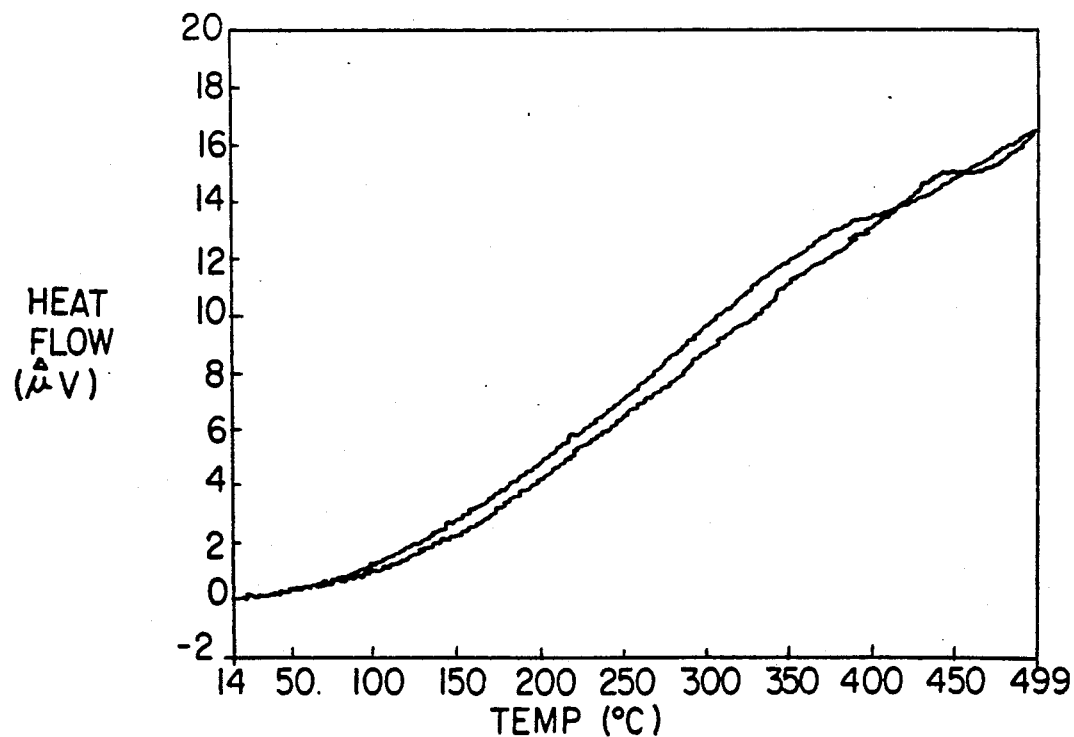
FIG. 7 is a curve showing the relationship between heat flow (dissipation) and temperature for NiAlCrOx semiconductors produced according to the present invention.

Referring to FIG. 7, a thermal gravity analysis of the nickel aluminum chrome oxide solid solution semiconductor is shown. As is evident, the semiconductor maintains a relatively stable dissipation from 14°–500° C. The relationship shown is nearly identical to the relationship obtained with an alumina substrate, establishing that the semiconductor exhibits structural properties similar to alumina, which is commonly used as the substrate for said semiconductors. Since the relationship in heat dissipation is nearly identical to the relationship with the substrate, the semiconductor can operate over a wide range of temperatures without causing stress between the alumina substrate and the semiconductor which may cause failure of the device. Consequently, a material is provided which has structural properties similar to the ceramic substrate, yet has functional properties which can be tailored to produce specific electronic functions, such as displaying a positive temperature coefficient or a negative coefficient, and of course, other properties can be produced by using the different metal combinations in different proportions.

(5) Sintered Composite

For the manufacture of a sintered composite, metal oxide-ceramic (zircon) composite particles are mixed under agitation with particles of a metal such as iron and/or fine particles of a ceramic material such as zircon, and the mixture to which water or a binder is added is kneaded to prepare a sludge.

This sludge is charged into a mold to which vibration is imparted, and the sludge charged into the mold is heated to vaporize the water. Then, pressure is applied by a pressure plate to the sludge in the vibrating mold and, after heating the sludge again, the sludge is cooled and separated from the mold to obtain a molded block. When water remains still in the molded block, the molded block is dried and then baked in a high-temperature furnace at the atmospheric pressure or a lower pressure. As a result, the fine ceramic particles and/or the metal particles are integrally homogeneously compounded with the metal oxide-ceramic composite particles to provide a sintered composite.

In the sintered composite thus manufactured, the fine ceramic particles and/or the metal particles are homogeneously and dispersely mixed and sintered with the metal oxide-ceramic composite particles. Therefore, the sintered composite has various advantages in that it is wear resistive, heat resistive and corrosion resistive, its hardness is high, its coefficient of thermal expansion is low, it is heat insulating, and it shows satisfactory magnetic characteristics.

What is claimed is:

1. A metal oxide-ceramic material consisting essentially of a homogeneous solid solution of a precipitated metal oxide and a ceramic prepared by melting and cooling metal oxide-ceramic composite particles having a ceramic particle with a surface film formed of a precipitated crystalline metal oxide reacted and precipitated in a reduction reaction of complex metal ions.

2. The material according to claim 1 wherein said ceramic particles are from the group consisting essentially of zircon, zirconia, silicon dioxide, alumina, cobalt oxide, titanium oxide, barium oxide, boron oxide, an oxide, a nitride and a carbide of a metallic element or a semi-metallic element.

3. The material according to claim 1 further comprising complex metal or semi-metal ions, which are reacted and precipitated with the complex metal ions to form the surface film.

4. The material according to claim 1 wherein said metal oxide-ceramic composite powder is melted by a high-speed plasma device.

5. A homogeneous solid solution of a metal oxide ceramic material produced by preparing metal oxide-ceramic composite particles which comprise fine particles of a first ceramic having firmly deposited crystals of an oxide formed by a reduction reaction of complex metal ions; mixing said metal oxide-ceramic composite particles with fine particles of a second ceramic and particles of a metal; and sintering the mixture.

6. A material according to claim 5 wherein said first and second ceramic particles are from the group consisting essentially of zircon, zirconia, silicon dioxide, alumina, cobalt oxide, titanium oxide, barium oxide, boron oxide, an oxide, a nitride and a carbide of a metallic element or a semi-metallic element.

7. The material according to claim 5 further comprising complex metal or semi-metal ions, which are reacted and precipitated with the complex metal ions to form the firmly deposited crystals.

8. The material according to claim 6 wherein said metal oxide-ceramic composite powder is melted by a high-speed plasma device.

* * * * *